US008275849B2

(12) United States Patent
Kim

(10) Patent No.: US 8,275,849 B2
(45) Date of Patent: Sep. 25, 2012

(54) WIRELESS NETWORK AND METHOD FOR SHARING FLEXIBLE DATA BETWEEN A MASTER AND SLAVES IN REAL TIME

(75) Inventor: Hoe-Won Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 2227 days.

(21) Appl. No.: 10/692,895

(22) Filed: Oct. 24, 2003

(65) Prior Publication Data

US 2004/0088387 A1    May 6, 2004

(30) Foreign Application Priority Data

Oct. 24, 2002    (KR) .................. 10-2002-0065242

(51) Int. Cl.
G06F 15/16    (2006.01)
(52) U.S. Cl. ........................................ 709/208; 709/220
(58) Field of Classification Search .................. 709/208, 709/220
See application file for complete search history.

(56) References Cited

U.S. PATENT DOCUMENTS

| 6,119,016 | A * | 9/2000 | Matusevich | 455/502 |
| 6,256,634 | B1 * | 7/2001 | Moshaiov et al. | 707/100 |
| 7,072,911 | B1 * | 7/2006 | Doman et al. | 707/201 |
| 2004/0243684 | A1 * | 12/2004 | Ha et al. | 709/208 |

* cited by examiner

Primary Examiner — Brian P Whipple
(74) Attorney, Agent, or Firm — The Farrell Law Firm, P.C.

(57) ABSTRACT

A wireless network for sharing flexible data between one master and at least two slaves in real time. The wireless network comprises a master, a plurality of slaves belonging to the master, and a shared channel connecting the master with the slaves, wherein the master periodically sends identifier information for first data which a network contains to at least one slave, receives at least one request for data from at least one slave, finds the requested data and sends the requested data to the corresponding slave, and wherein the slave detects identifier information for second data which the slave itself does not contain and which excludes identifier information for third data which the slave itself contains from the identifier information for the first data and which is received from the master, requests the master to send the second data, receives the second data through the shared channel, updates identifier information for the received second data in addition to the identifier information for the third data, and stores the received second data in addition to the third data.

5 Claims, 3 Drawing Sheets

WIRELESS NETWORK AND METHOD FOR SHARING FLEXIBLE DATA BETWEEN A MASTER AND SLAVES IN REAL TIME

PRIORITY

This application claims priority to an application entitled "Wireless Network And Method For Sharing Flexible Data Between Master And Slaves In Real Time" filed in the Korean Industrial Property Office on Oct. 24, 2002 and assigned Serial No. 2002-65242, the contents of which are hereby incorporated by reference.

BACKGROUND OF THE INVENTION

1. Field of the Invention

The present invention relates generally to a communication protocol for wireless networks, and in particular to a wireless network and method for sharing flexible data between one master and a plurality of slaves in real time.

2. Description of the Related Art

With the rise of the communication technology field, processing of various types of data, for example, their classifying or sharing, begins to appear as a factor to be considered in increasing communication efficiency in many respects.

A specific group of people or organizations may share identical items, for example, a society bulletin, a newsflash, stock information, or an in-house bulletin, with all members. The items may often undergo a change. Here, a change means addition, correction, or deletion. In other words, data containing such items has flexibility. A protocol of a typical one-to-one communication system in which attributes of this flexible shared data are not considered incurs greater communication cost. In general, total communication cost is calculated by multiplying communication cost per terminal by the number of terminals. Therefore, the total communication cost is increased, as the number of terminals is increased. For this reason, a transport protocol needs to be defined to provide a proper definition for the data classification and to effectively share the data satisfying the definition with the members.

SUMMARY OF THE INVENTION

Accordingly, the present invention has been designed to solve the above-mentioned problems occurring in the prior art, and an object of the present invention is to provide a wireless network for sharing flexible data between one master and a plurality of slaves in real time.

In order to accomplish the above and other objects, there is provided a wireless network comprising: a master, a plurality of slaves belonging to the master, and a shared channel connecting the master with the slaves. The master periodically sends identifier information for first data, which a network contains, to at least one slave, receives at least one request for data from at least one slave, finds the requested data, and sends the requested data to the corresponding slave. The slave detects identifier information for second data that the slave itself does not contain and which excludes identifier information for third data that the slave contains from the identifier information for the first data and that is received from the master, requests the master to send the second data, receives the second data through the shared channel, updates identifier information for the received second data in addition to the identifier information for the third data, and stores the received second data in addition to the third data.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description of the present invention, a detailed description of known functions and configurations incorporated herein will be omitted when it may make the subject matter of the present invention rather unclear.

In a first embodiment of the present invention, data is designated as follows: Rn, Rn+1, Rn+2, . . . , Rm. When x of Rx is larger than y of Ry, Rx has been generated later than Ry. Further, data, which is no longer effective after a lapse of time, is removed from a set of the data.

As stated above, data is subjected to addition, deletion, or correction from time to time (i.e., being flexible), and is shared in real time through a plurality of terminals that receive service from an identical base station transceiver subsystem. These shared data are capable of being updated in real time. The shared data can be, for example, a society bulletin, a newsflash, stock information, an in-house bulletin, etc. For example, with an in-house bulletin, public notices intended to be provided to the members of a company are continuously bulletined. The public notices are changed by addition of new ones, deletion of out-of-date ones, or correction of the existing ones. These notices do not need to be provided as text, thus enabling any type of data to be provided. That is to say, all types of data may undergo addition, deletion or correction in this manner.

Figure 1:
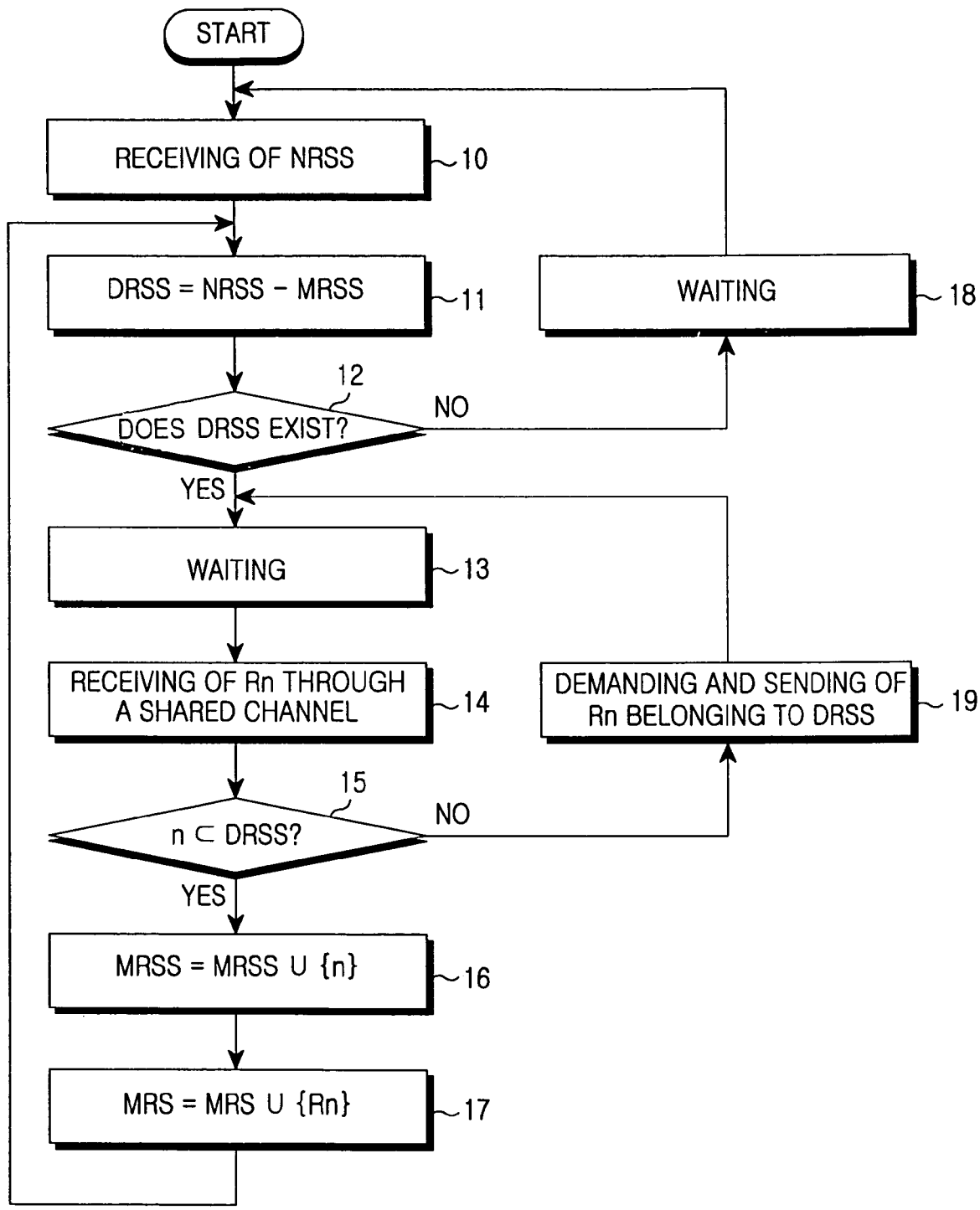
FIG. 1 is a flow chart illustrating a method for receiving data in a mobile wireless terminal from a base station through a shared channel in a wireless network according to a preferred embodiment of the present invention.

FIG. 1 is a flow chart illustrating a method for receiving data in a slave from a master through a shared channel in a wireless network according to a preferred embodiment of the present invention. Here, the slave may be implemented as a mobile wireless terminal, and the master as a base station.

The meanings of the abbreviated characters designated in the drawings are provided as follows: Rn represents data that is transmitted into a shared channel at a certain time, where n is specific identifier information of data. Therefore, data is designated as R1, R2, R3, . . . , Rn (R: Record, n: number of identifier information). MRS (Mobile RS (Record Set)) represents data that is received and used by a certain mobile wireless terminal. For example, the MRS of the mobile wireless terminal may be designated as {R1, R2}. NRS (Network RS (Record Set)) represents shared data that a network has at a certain time point. The NRS of the network may be designated, for example, as {R1, R2, R3, R4}. MRSS (MRS Status) represents a list of data contained in the MRS, i.e., a set of specific identifier information for data contained in the MRS. The MRSS may be for example {1, 2}. NRSS (NRS Status) represents a list of data contained in the NRS, i.e., a set of specific identifier information for data contained in the NRS. The NRSS may be for example {1, 2, 3, 4}. DRSS (Data RS Status) excludes the MRSS from the NRSS, and represents identifier information for data that the mobile wireless terminal does not contain at a current time point among the shared data. According to this definition, the DRSS may be {3, 4}.

Referring to FIG. 1, the mobile wireless terminal receives identifier information NRSS for data which a network contains, from a base station in step 10. The mobile wireless terminal detects identifier information DRSS for data that the mobile wireless terminal does not contain, from the identifier information NRSS for data that the network contains in step 11. The identifier information DRSS for data that the mobile wireless terminal does not contain is to exclude identifier information MRSS for data that the mobile wireless terminal itself contains.

The mobile wireless terminal checks whether the identifier information DRSS exists in step 12. If the identifier information DRSS exists, the mobile wireless terminal waits for a given time in step 13, and then receives real data Rn through the shared channel from the base station in step 14.

The mobile wireless terminal checks whether identifier information n of the received data Rn is contained in the identifier information DRSS in step 15. If identifier information n of the received data Rn is contained in the identifier information DRSS, the mobile wireless terminal updates the identifier information n of the received data Rn in addition to the identifier information MRSS in step 16. Then, the mobile wireless terminal stores the received data Rn in addition to the data, which the mobile wireless terminal contains in step 17.

In step 14, a synchronization operation must be entailed to determine a starting position of data depending on attributes of the pertinent discrete system. In this case, it is preferred that the system is designed to allow sleep to be performed as much as possible up to a time point when the transmission of desired data is initiated. For instance, each datum is capable of slipping up to a desired time point along with schedule information of data to be transmitted. If desired data is not received, the mobile wireless terminal requests that its own information (i.e., the list of data contained in the DRSS) should be sent through an uplink channel. The uplink channel my be effectively operated according to the condition of the discrete system. For example, random access may be given to a shared uplink channel by using an aloha protocol.

In step 15, if the identifier information n of the received data Rn is not contained in the identifier information DRSS, the mobile wireless terminal sends the identifier information DRSS to the base station and demands transmission of the corresponding data Rn from the base station in step 19, and then returns to step 13.

In step 12, if nothing exists in the identifier information DRSS, that is to say, if the mobile wireless terminal contains all the shared data, the mobile wireless terminal waits for a given time until the next period is initiated in step 18, and then returns to step 10.

Figure 2:
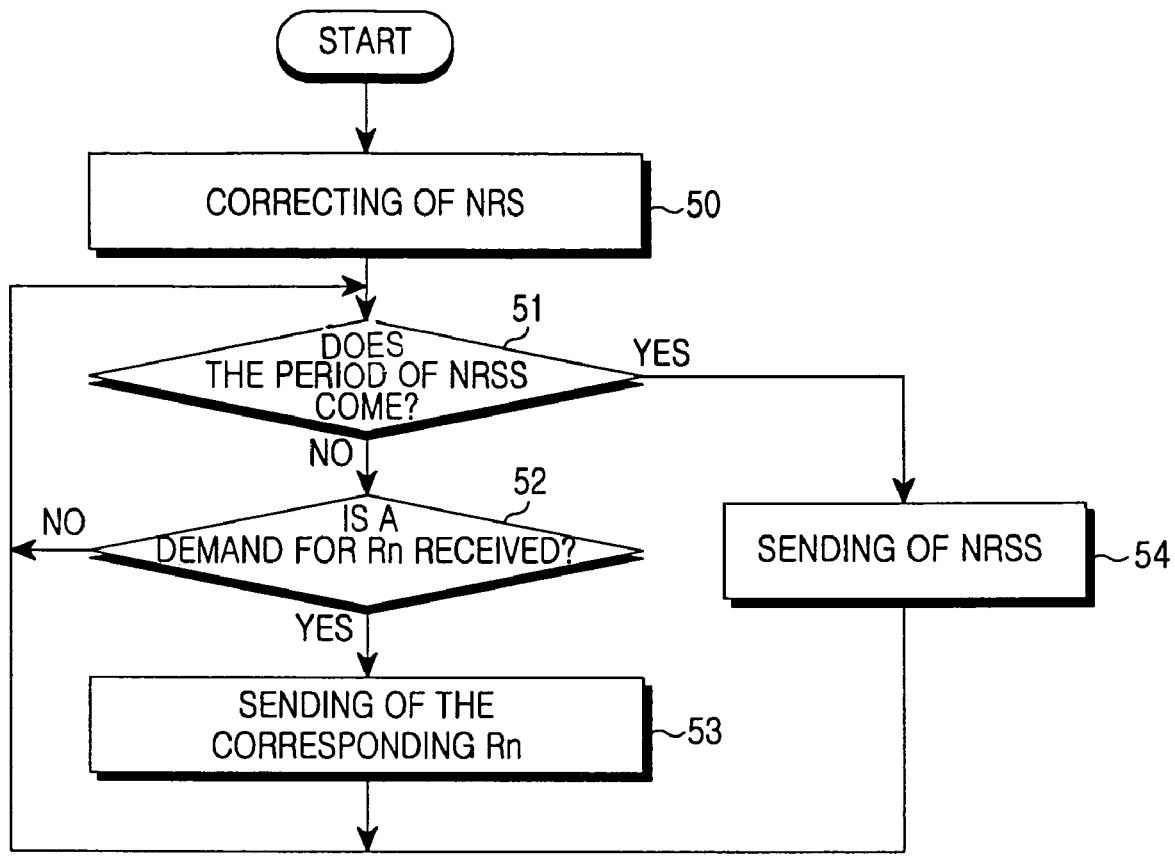
FIG. 2 is a flow chart illustrating a method for sending data from a base station to a mobile wireless terminal through a shared channel in a wireless network according to a preferred embodiment of the present invention.

FIG. 2 is a flow chart illustrating a method for sending data from a base station to a mobile wireless terminal through a shared channel according to a preferred embodiment of the present invention. A base station performs correcting of data NRS, which a network contains through various routes in step 50. The base station checks whether the period to send identifier information NRSS for data, which a network contains, comes in step 51. If the period to send identifier information NRSS comes, the base station provides the identifier information NRSS to the corresponding mobile wireless terminals through a shared channel in a form of system information in step 54.

If the period to send identifier information NRSS does not come, the base station checks whether or not a demand for the data Rn has been received from a certain mobile wireless terminal in step 52. If a demand for the data Rn has been received from a certain mobile wireless terminal, the base station sends the corresponding data Rn in step 53. Here, the demand for the data Rn is a demand that is performed in the step 19 illustrated in FIG. 1.

After step 53 or 54 is performed, the base station returns to step 51.

In case that Rn and NRSS are transmitted through separate channels, they can be simultaneously transmitted.

Figure 3:
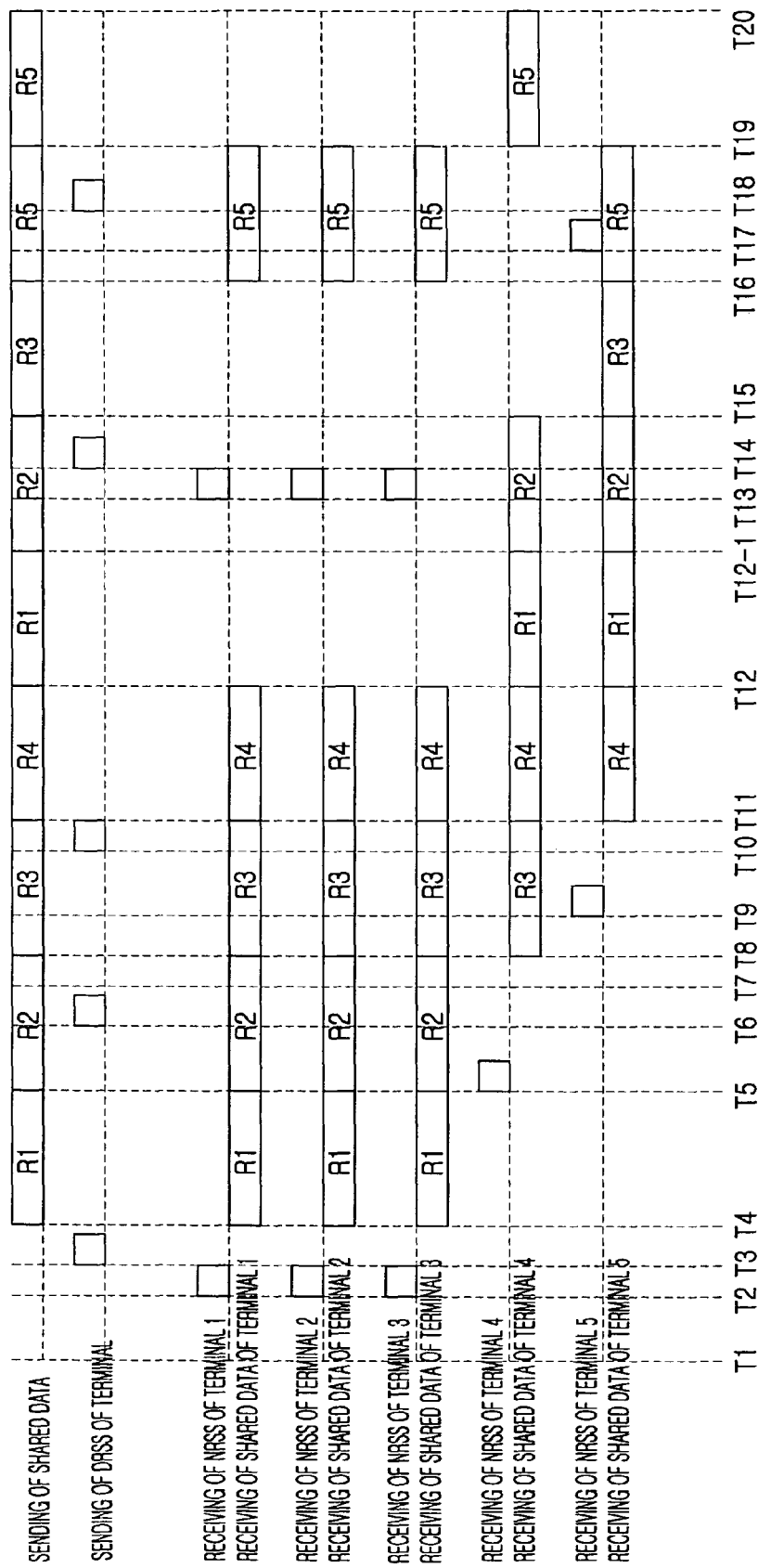
FIG. 3 is a timing diagram of a method for sending data from a base station to a mobile wireless terminal through a shared channel according to a preferred embodiment of the present invention.

FIG. 3 is a timing diagram of a method for sending data from a base station to a mobile wireless terminal through a shared channel according to a preferred embodiment of the present invention. Referring to FIG. 3, efficiency of the network, which is obtainable according to the present invention, will be calculated as follows. A recording order Tn (n is a natural number) is to be based on the elapse of time.

T1: At this time point, the NRS is {R1, R2, R3, R4} (not shown).

T2: Of first to fifth mobile wireless terminals belonging to the base station, the first to third ones are powered on to check the NRSS. The first to third wireless terminals receive {1, 2, 3, 4} as the NRSS from the base station.

T3: The first to third wireless terminals detect the DRSS. The detected DRSS is {1, 2, 3, 4}, which means that the first to third wireless terminals do not yet have any shared data when considering the T2. In this case, the first to third wireless terminals send the DRSS to the base station and then demand the sending of the corresponding data from the base station.

T4: The first to third wireless terminals begin to receive the R1 from the base station through the shared channel.

T5: The first to third wireless terminals begin to receive the R2 from the base station through the shared channel. The fourth wireless terminal is powered on to check the NRSS. The fourth wireless terminal receives {1, 2, 3, 4} as the NRSS from the base station.

T6: The fourth wireless terminal detects the DRSS. The detected DRSS is {1, 2, 3, 4}. The fourth wireless terminal sends the DRSS to the base station and then demands that the base station send the corresponding data.

T7: At this time point, new data R5 is added to the NRS. The NRS is {R1, R2, R3, R4, R5} (not shown).

T8: The first to fourth wireless terminals begin to receive the R3 from the base station through the shared channel.

T9: The fifth wireless terminal is powered on to check the NRSS. The fifth wireless terminal receives {1, 2, 3, 4, 5} as the NRSS from the base station.

T10: The fifth wireless terminal detects the DRSS. The detected DRSS is {1, 2, 3, 4, 5}. The fifth wireless terminal sends the DRSS to the base station and then demands that the base station send the corresponding data.

T11: The first to fifth wireless terminals begin to receive the R4 from the base station through the shared channel.

T12: The fourth and fifth wireless terminals begin to receive the R1 from the base station through the shared channel. When the DRSS is detected following the results received in T11, nothing exists in the DRSS detected by the first to third mobile wireless terminals, indicating that the first to third mobile wireless terminals are in a slip mode.

T12-1: The fourth and fifth wireless terminals begin to receive the R2 from the base station through the shared channel.

T13: The first to third wireless terminals are reactivated, and the NRSS is checked. The first to third wireless terminals receive {1, 2, 3, 4, 5} as the NRSS from the base station.

T14: The first to third wireless terminals detect the DRSS. According to T4, T5, T8, and T11, the first to third wireless terminals already contain R1, R2, R3, and R4. Therefore, in this case, the detected DRSS is {5}. The first to third wireless terminals send the DRSS to the base station, and demand the sending of the corresponding data from the base station.

T15: The fifth wireless terminal begins to receive the R3 from the base station through the shared channel. When the DRSS is detected following the results received in T12-1, nothing exists in the DRSS detected by the fourth mobile wireless terminal, indicating that the fourth mobile wireless terminal is in a slip mode.

T16: The first, second, third and fifth wireless terminals begin to receive the R5 from the base station through the shared channel.

T17: The fourth wireless terminal is reactivated, and then the NRSS is checked.

T18: The fourth wireless terminal detects the DRSS. According to T8, T11, T12, and T12-1, the fourth wireless terminal already contains R1, R2, R3, and R4. Therefore, in this case, the detected DRSS is {5}. The fourth wireless terminal sends the DRSS to the base station, and demands sending of the corresponding data from the base station.

T19: The fourth wireless terminal begins to receive the R5 from the base station through the shared channel. When the DRSS is detected following the results received in T16, nothing exists in the DRSS detected by the first, second, third, and fifth mobile wireless terminals, indicating that the first, second, third and fifth mobile wireless terminals are in slip modes.

T20: When the DRSS is detected depending on the results received in T19, nothing exists in the DRSS detected by the fourth mobile wireless terminal, indicating that the fourth mobile wireless terminal is in a slip mode.

According to the routine as described above, a total receiving bandwidth, which the five mobile wireless terminals require to receive all five data, is a receiving bandwidth for 9 multiple unit data. The number 9 is the number of data of R1, R2, R3, R4, R1, R2, R3, R5, and R5 which are received between T4 and T5, between T5 and T8, between T8 and T11, between T11 and T12, between T12 and T12-1, between T12-1 and T15, between T15 and T16, between T16 and T19 and between T19 and T20, respectively. In contrast, when using a typical dedicated channel, free from a shared channel, the total receiving bandwidth is a receiving bandwidth for 25 multiple unit data, where 25 is a value multiplying the number of mobile wireless terminals, 5, by the number of data, 5.

As illustrated above, the present invention has an advantage in that it shares flexible data at a minimum communication cost.

While the invention has been shown and described with reference to certain preferred embodiments thereof, it will be understood by one skilled in the art that various modifications may be made therein without departing from the spirit and scope of the invention as defined by the appended claims.

What is claimed is:

1. A wireless network comprising a master, a plurality of slaves belonging to the master, and a shared channel connecting the master with the slaves;

wherein the master periodically and wirelessly sends identifier information for first data that the network contains to at least one slave, receives at least one request for data from at least one slave, finds the requested data, and wirelessly sends the requested data to the corresponding slave through the shared channel;

wherein a slave detects identifier information for second data that the slave itself does not contain and which excludes identifier information for third data that the slave itself contains from the identifier information for first data received from the master, requests the master to send the second data, wirelessly receives the data through the shared channel, determines whether the received data is contained in its second data, updates identifier information for the received data in addition to identifier information for the third data; and stores the received data in addition to the third data when the received data is contained in the second data, and requests the master to again send the second data when the received data is not contained in the second data; and whereby the data requested by the slave is received and stored by other slaves that need it simultaneously so flexible data between the master and the slaves are shared in real time.

2. A wireless network according to claim 1, wherein the master is a base station, and each of the slaves is a mobile wireless terminal.

3. A method for enabling any one of a plurality of slaves to receive data from a master through a shared channel to share flexible data in real time on a wireless network, comprising:

wirelessly receiving identifier information for first data, which the network contains from the master;

detecting identifier information for second data that the slave itself does not contain and excluding identifier information for third data that the slave itself contains from the identifier information for the first data received from the master;

when there is identifier information for the second data, wirelessly receiving data from the master through the shared channel;

determining whether identifier information for the received data is contained in the identifier information for the second data;

when identifier information for the received data is contained in the identifier information for the second data, updating the identifier information for the received data in addition to the identifier information for the third data, and storing the received data in addition to the third data; and when identifier information for the received data is not contained in the identifier information for the second data, wirelessly sending the identifier information for the second data to the master, and requesting the master to send the second data.

4. A method according to claim 3, wherein the master is a base station, and each of the slaves is a mobile wireless terminal.

5. A method according to claim 3, further comprising, when there is no identifier information for the second data, returning to the step of receiving the identifier information, after waiting for a predetermined time.

* * * * *